July 3, 1951 E. V. WISE, SR 2,558,892
AGITATING MECHANISM FOR AGITATING POTATO CHIPS
IN COOKING LIQUID
Filed July 14, 1948 2 Sheets-Sheet 2

Earl V. Wise, Sr.
INVENTOR.

Patented July 3, 1951

2,558,892

UNITED STATES PATENT OFFICE 2,558,892

AGITATING MECHANISM FOR AGITATING POTATO CHIPS IN COOKING LIQUID

Earl V. Wise, Sr., Berwick, Pa., assignor to Wise Potato Chip Company, Berwick, Pa.

Application July 14, 1948, Serial No. 38,675

5 Claims. (Cl. 99—406)

My invention relates to improvements in apparatus for agitating potato chips while in cooking liquid, such as deep fat, cooking oil, and the like.

A primary object of the invention is to provide simply constructed, inexpensive, apparatus for keeping potato chips immersed in such liquid during cooking, and both the potato chips and the liquid agitated and constantly moving in a manner to obtain better cooked potato chips than can be obtained with present day apparatus.

Another object is to provide for cooking potato chips in a circulating body of cooking liquid propelled intermittently to circulate with a surging action so as to agitate the same and the potato chips therein and keep the potato chips immersed in the liquid.

Still another object is to provide apparatus for positively agitating the potato chips in cooking liquid while causing the liquid to circulate with a surging action to additionally agitate the potato chips and to float the potato chips supplied to the apparatus to a point of discharge remote from the point of supply.

Still another object is to provide in such apparatus agitating mechanism of the reciprocating type operated to agitate the cooking liquid so as to cause the same to flow in one direction and float potato chips away from the agitator in a surging body of the liquid and to maintain the potato chips agitated during their course of travel from a point of supply to a point of discharge.

Still another object is to provide in such an apparatus agitating mechanism of the reciprocating agitator type adapted to positively push potato chips in liquid ahead of the agitator in one direction of movement of the agitator only.

Other and subordinate objects also within the purview of my invention, together with the precise nature of my improvements will be readily understood when the succeeding description and claims are read with reference to the drawings accompanying and forming part of this specification.

In said drawings:

Figure 4 is a view in perspective of the agitator head.

Figure 1:
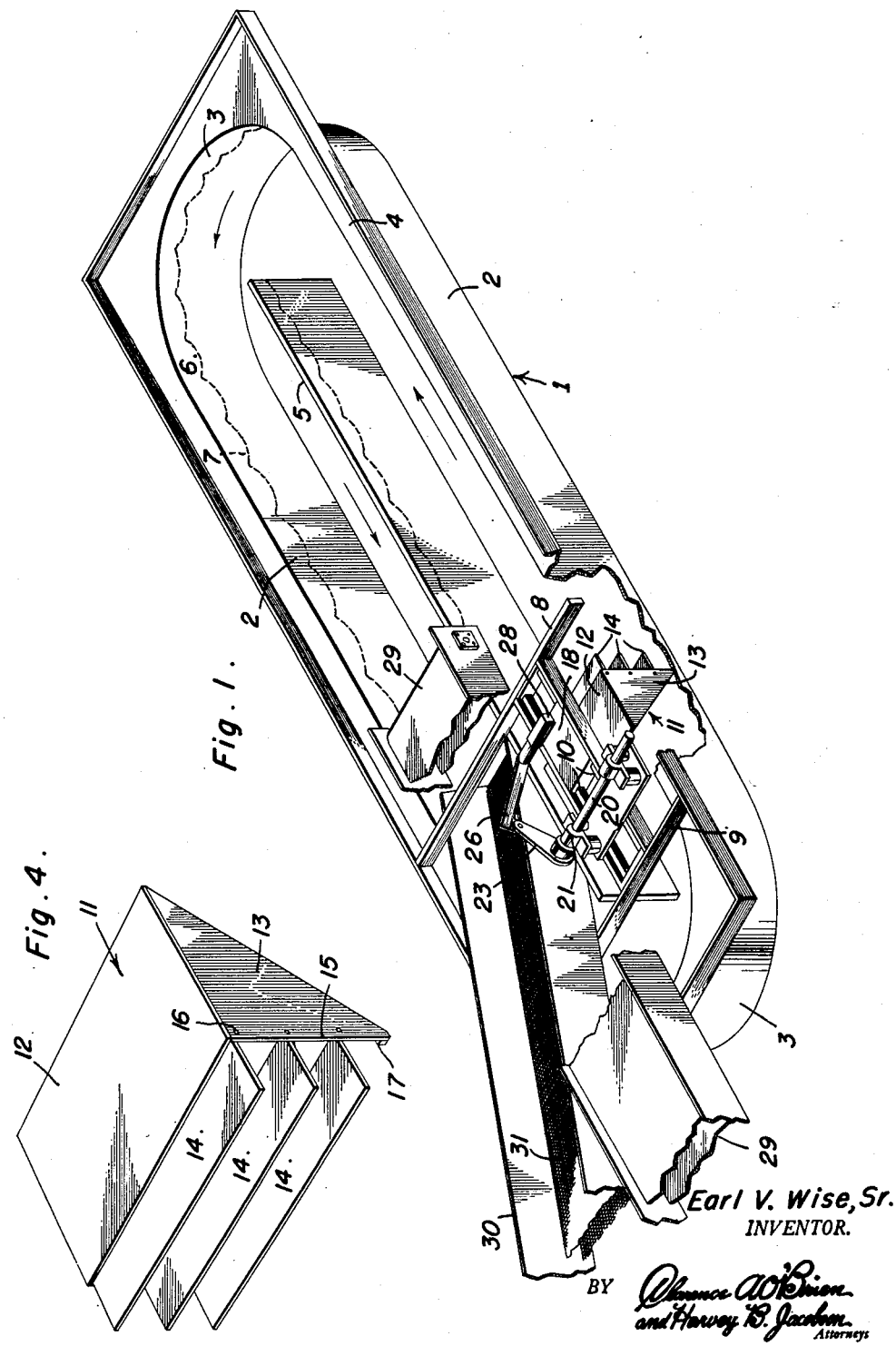
Figure 1 is a view in perspective, partly broken away and shown in section, of my improved apparatus in the preferred embodiment thereof.

Referring to the drawings by numerals, my improved apparatus, as illustrated, comprises a flat bottomed cooking vat 1, preferably of elongated form with parallel straight sides 2 and rounded ends 3 and with an external, right angled, rim gutter 4 extending around the same. An upstanding partition plate 5 in the longitudinal centre of the vat 1 terminating short of the ends 2 divides said vat to form therein an elongated, substantially elliptical receptacle 6 for containing a substantially elliptical body of cooking liquid indicated in Figure 1 by the broken lines and designated 7.

Adjacent one end 2 of the vat 1 is my improved agitator mechanism now to be described. The agitator mechanism comprises a pair of front and rear supporting frame bars 8, 9 extending across the top of the vat 1 with ends suitably fixed in the gutter 4 as by welding, not shown. A pair of laterally spaced T shaped tracks 10 extend between and are suitably connected to the frame bars 8, 9 between said plate 5 and one side 2 of the vat 1, which is to say over one side of the receptacle 6 adjacent to one end thereof and extending lengthwise of the same.

Suspended, by a mounting presently described, from the tracks 10 for reciprocation longitudinally in said side of the receptacle 6 is an agitator head 11 comprising a rectangular top plate 12 with right-angled, triangular shaped, end ears 13 depending therefrom, and which extends across said side of the receptacle 6 and fits therein with a working clearance with a front side facing the far, or remote end 2 of the vat 1, or receptacle 6.

On the front side thereof the agitator head 11 is normally closed by a plurality of blade-like, rectangular, flaps 14 extending endwise between said ears 13 in a vertically arranged series, between front edges 15 of the ears 13, and which are hinged at top longitudinal edges thereof by pins 16 in said ears 13 to swing downwardly into edge overlapping, closed, relation under the influence of gravity with free longitudinal edges of higher flaps in front of lower flaps for a purpose presently seen. As will be understood, the flaps 14 are free to swing upwardly into open position. A pair of lower stop lugs 17 on the ears 13 establish the closing position of the lowermost flap 14 of the series.

The mounting for the agitator head 11 comprises an elongated, channel sided slide block 18 fitted between and on the tracks 10 for reciprocation therebetween and from which the agitator head 11 is suspended by a pair of posts 19 upstanding from the top plate 12.

Means for reciprocating the slide block 18, and hence the agitator head 11, is provided comprising a horizontal drive shaft 20 extending across the slide block 18 crosswise of the vat 1, in a pair of bearings 21 upstanding from a plate 22 overlying the tracks 10 and said slide block 18 and suitably fixed on one track 10. A crank arm 23 at one end of the drive shaft 20 is pivoted, as at 24, to a laterally extending end 25 of a link 26 having its other end pivoted, as at 27, to a boss 28 on top of the slide block 18.

Figures 2, 3:
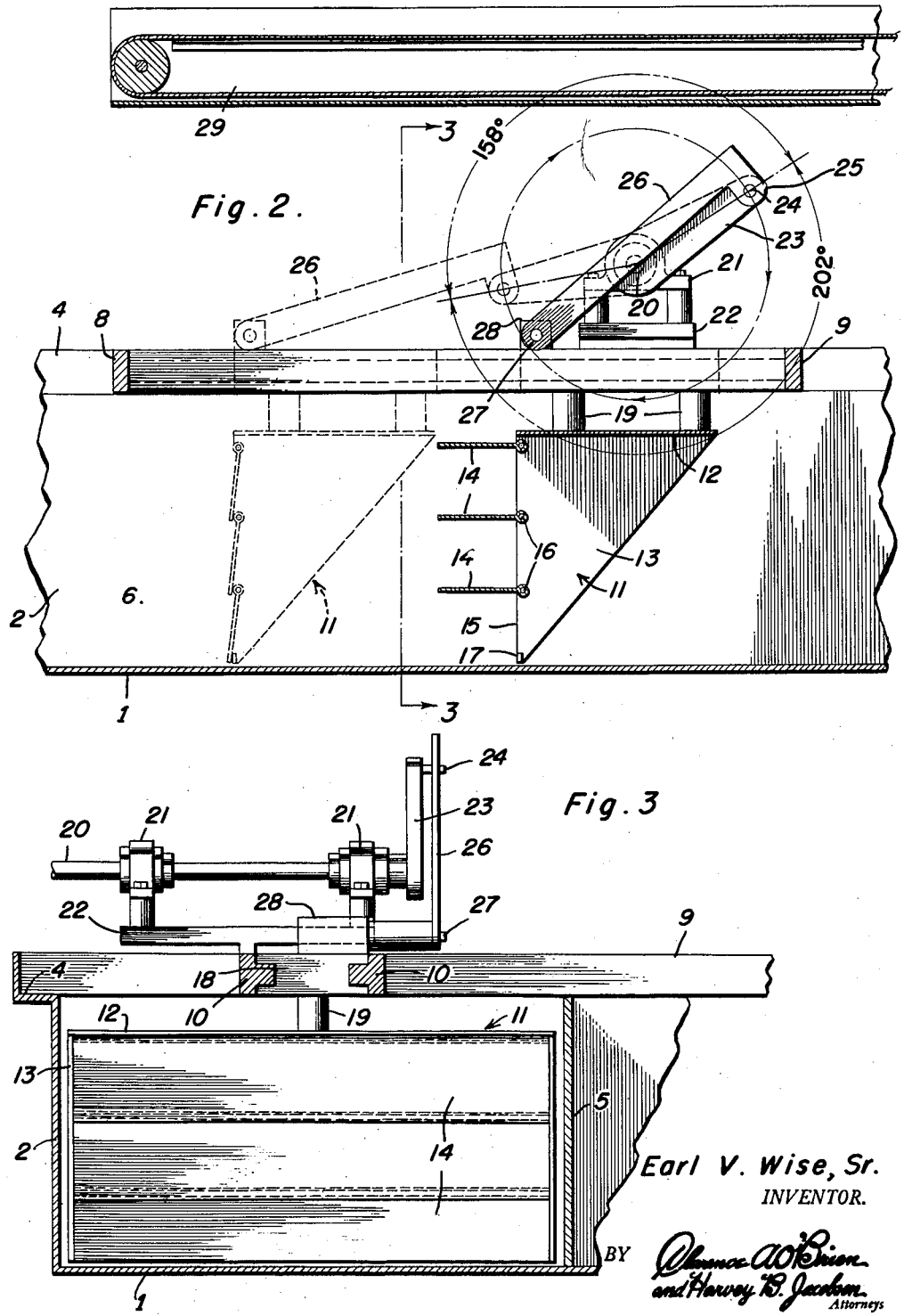
Figure 2 is a fragmentary view in vertical longitudinal section drawn to a larger scale.
Figure 3 is a view in transverse section taken on a line 3—3 of Figure 2.

As shown in Figure 2, the drive shaft 20 is vertically offset above the pivotal connection 27 of the link 26 to the boss 28 so that when said crank arm 23 is revolved, clockwise as indicated by the arrows in Figure 2, said crank arm operates through a long arc of substantially 202 degrees to advance the slide block 18 and agitator head 11 into the limit of their forward or advance stroke as indicated by the dotted lines shown in Figure 2, said crank arm then revolving through a relatively short arc of 158 degrees to retract said block 18 and head 11 into the limits of their return or retracting stroke. The advantage of this arrangement will presently appear.

An endless conveyor 29 extends over the agitator mechanism from the adjacent end 2 of the vat 1, or receptacle 6, to supply raw potato chips, not shown, in the side of the receptacle 6 in which the agitator head 11 works, and in advance of said head in the limit of the advance or forward stroke thereof.

A discharge conveyor 30 inclines upwardly out of the other side of the receptacle 6 from a point substantially opposite the agitator mechanism and extends over the end 2 of the vat 1, or receptacle 6, adjacent to which said mechanism is located, said conveyor 30 having an endless belt 31 for conveying cooked potato chips out of the designated side of the receptacle 6 in a direction opposite to the far or remote end of the vat 1, or receptacle 6, said belt being foraminous to pass a liquid therethrough.

Referring now to the operation of the described apparatus, with the vat 1 being subjected to the action of heat for cooking in the body of liquid 7, and with potato chips, not shown, in the liquid in advance of the agitator mechanism and the drive shaft 20 being slowly rotated by any suitable drive, not shown, the agitator head 11 is reciprocated forwardly and rearwardly to advance and retract the same in the sides of the receptacle 6 in which said head is located. During the advance, or forward, stroke of the agitator head 11, the flaps 14, under pressure of the liquid 7 against the same, are maintained closed and operate to push the liquid in front of the same forwardly, together with the potato chips, thus causing the liquid to circulate around the receptacle 6 in the direction of the discharge conveyor 30 while at the same time agitating the potato chips positively in the liquid and submerging the same therein. During the return, or retracting stroke of the agitator head 11, the flaps 14 will open, under pressure of liquid against the same, as soon as said head begins to retract, and will thereby be rendered ineffective as regards retarding the circulation of the liquid. For reasons previously pointed out, the retracting or return stroke of the agitator head 11 is quicker than the advance or forward stroke thereof which reduces the time during which the flaps 14 are operating ineffectively, as compared with the duration of their effective operation. This contributes towards obviating retarding of the circulation, or flow, of the liquid 7 as will be clear. As will be seen, the liquid 7 is intermittently pushed or propelled forwardly of the agitator head 11 and thereby caused to circulate or flow with a surging action contributing to agitation of the potato chips, and the liquid, and submerging of the potato chips in the liquid. Upon circulation of the liquid 7, the potato chips are flowed thereby for a substantial distance around the receptacle 6 until the same encounter the discharge conveyor 30, which, as will be understood, extends into the liquid and picks up the then cooked potato chips and conveys the same out of the receptacle 6 from the side of said receptacle opposite to that in which the agitator head 11 operates. The belt 31 being foraminous offers no resistance to the circulation of the liquid 7 but picks up the potato chips and lifts the same out of the liquid 7 while allowing the cooked chips to drip back into the receptacle 6 so as to drain excess liquid off the same.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described my invention, what is claimed as new is:

1. The combination with a receptacle for containing cooking liquid and potato chips to be cooked in the liquid, said receptacle having an outturned top gutter extending around the same, of a frame fitting in said gutter and fixed therein, a pair of track bars extending across said frame, a slide block mounted on said track bars to reciprocate between the same, an agitator head depending from said block into said receptacle to be reciprocated in said liquid by said block and comprising hinged flaps swingable in opposite directions by pressure of the liquid there against when said head is moved in opposite directions, and means to reciprocate said block.

2. The combination with a receptacle for containing cooking liquid and potato chips, of means for supplying potato chips to said receptacle, an endless conveyor for discharging the potato chips out of the receptacle inclining upwardly out of the receptacle at a point remote from said supply means, and means for propelling the liquid and potato chips toward said conveyor and agitating the same comprising an agitator head, means mounting said head in said receptacle for reciprocation horizontally therein, said head including a vertical series of liquid agitating flaps hingedly mounted in pendent overlapping relation to swing into engaging closed relation by pressure of the liquid thereagainst upon movement of said head in one direction and swinging into open disengaged relation by pressure of the liquid thereagainst upon movement of said head in the opposite direction, and power means for reciprocating said head.

3. The combination according to claim 2 wherein said last-named means comprises a crank and pitman drive for said head, said crank revolving through a long arc to move said head in the first-mentioned direction and revolving through a shorter arc to move the head in the second-mentioned direction whereby during each revolution of said crank the flaps are opened for a short time interval and closed for a longer time interval to facilitate agitation of the liquid by said flaps.

4. The combination with a receptacle for containing cooking liquid and potato chips to be cooked in the liquid, of an agitator head, means mounting said head in said receptacle for reciprocation horizontally, said head including a horizontal top plate having depending end ears, a vertical series of elongated liquid agitator flaps hinged to said ears in pendent overlapping relation to swing into engaging closed relation by pressure of the liquid thereagainst upon movement of said head in one direction and swinging into open disengaged relation by pressure of the liquid thereagainst upon movement of said head in the opposite direction, and means to reciprocate said head.

5. The combination according to claim 4 wherein said last-named means comprises a crank and pitman drive for said head, said crank revolving through a long arc to move the head in the first-mentioned direction and revolving through a shorter arc to move said head in the second-mentioned direction whereby during each revolution of said crank the flaps are opened for a short time interval and closed through a longer time interval to facilitate agitation of the liquid by said flaps.

EARL V. WISE, Sr.

REFERENCES CITED

The following references are of record in the file of this patent:

UNITED STATES PATENTS

| Number | Name | Date |
|---|---|---|
| 195,253 | Barnes | Sept. 18, 1877 |
| 1,467,396 | Shroyer | Sept. 11, 1923 |
| 1,688,315 | Denz et al. | Oct. 16, 1928 |
| 1,777,052 | Shepherd | Sept. 30, 1930 |
| 2,092,499 | Carpenter | Sept. 7, 1937 |
| 2,199,119 | Toews | Apr. 30, 1940 |